United States Patent
Huang et al.

(10) Patent No.: US 12,079,093 B2
(45) Date of Patent: Sep. 3, 2024

(54) BACKING UP AND RECOVERING METHOD OF FILE SYSTEM AND COMMUNICATION DEVICE THEREOF

(71) Applicant: Wistron NeWeb Corporation, Hsinchu (TW)

(72) Inventors: Yu-Lin Huang, Hsinchu (TW); JianYun Kong, Hsinchu (TW); HongSen Zhang, Hsinchu (TW); Chih-Yuan Tang, Hsinchu (TW)

(73) Assignee: WISTRON NEWEB CORPORATION, Hsinchu (TW)

( * ) Notice: Subject to any disclaimer, the term of this patent is extended or adjusted under 35 U.S.C. 154(b) by 4 days.

(21) Appl. No.: 18/152,184

(22) Filed: Jan. 10, 2023

(65) Prior Publication Data
US 2023/0297479 A1    Sep. 21, 2023

(30) Foreign Application Priority Data
Mar. 16, 2022 (CN) .......................... 202210258390.7

(51) Int. Cl.
*G06F 11/14* (2006.01)

(52) U.S. Cl.
CPC ...... *G06F 11/1469* (2013.01); *G06F 2201/84* (2013.01)

(58) Field of Classification Search
CPC .................... G06F 11/1469; G06F 2201/84
See application file for complete search history.

(56) References Cited

U.S. PATENT DOCUMENTS

| | | | |
|---|---|---|---|
| 6,516,347 B1 | 2/2003 | Nakamura | |
| 7,681,069 B1* | 3/2010 | Chellappa | G06F 11/1435 714/13 |
| 10,585,762 B2* | 3/2020 | Sankar | G06F 16/2365 |
| 2004/0030323 A1 | 2/2004 | Ullestad et al. | |
| 2016/0182544 A1* | 6/2016 | Adjaoute | G06Q 30/0185 705/7.15 |
| 2017/0235641 A1* | 8/2017 | Ancel | G06F 11/1458 707/654 |
| 2018/0322012 A1* | 11/2018 | Sharma | G06F 21/572 |

(Continued)

FOREIGN PATENT DOCUMENTS

| | | |
|---|---|---|
| CN | 107885615 A | 4/2018 |
| JP | H1049445 A | 2/1998 |

(Continued)

*Primary Examiner* — Merilyn P Nguyen
(74) *Attorney, Agent, or Firm* — McClure, Qualey & Rodack, LLP (57) ABSTRACT

A backing up and recovering method of a file system is applied to a communication device. In the backing up and recovering method, a detecting step is performed to drive a first processing unit to detect whether the file system is damaged, and then generate a detection result. A transmitting step is performed to drive the first processing unit to transmit the detection result to a second processing unit. In response to the detection result being the file system is damaged, the second processing unit executes a system recovering step which recovers the file system according to a backup data that corresponds to the file system and is stored in a storage unit, and in response to the file system being not damaged, the second processing unit executes a backup confirming step which confirms whether the storage unit has the backup data.

20 Claims, 4 Drawing Sheets

(56) References Cited

U.S. PATENT DOCUMENTS

| | | | |
|---|---|---|---|
| 2021/0193312 A1* | 6/2021 | Kapadia | H04L 67/12 |
| 2023/0376385 A1* | 11/2023 | Bhanjois | G06F 11/1464 |
| 2024/0045964 A1* | 2/2024 | Bednash | G06F 11/1451 |

FOREIGN PATENT DOCUMENTS

| | | |
|---|---|---|
| JP | 2000209239 A | 7/2000 |
| JP | 2011209834 A | 10/2011 |
| JP | 2015088123 A1 | 5/2015 |
| JP | 2020184265 A | 11/2020 |
| TW | 201222238 A | 6/2012 |

* cited by examiner

– 1 –
BACKING UP AND RECOVERING METHOD OF FILE SYSTEM AND COMMUNICATION DEVICE THEREOF

RELATED PATENT APPLICATION

This application claims the benefit of priority to China Patent Application No. 202210258390.7, filed on Mar. 16, 2022. The entire content of the above identified application is incorporated herein by reference.

BACKGROUND

Technical Field

The present disclosure relates to a backing up and recovering method of a file system and a communication device thereof, and more particularly, to a backing up and recovering method of an embedded file system and a communication device thereof.

Description of Related Art

An embedded file system is a module in an embedded system that accesses files. The embedded file system not only provides file system support to the embedded system and equipment, but also provides management functions for file inputs and outputs. The embedded system is prone to repeated system shutdowns and reboots when it is in conditions like high temperature, unstable power surge, insufficient power load, or low battery. During the reboot process, system internal parameters may get lost such that the system setting is reset to the factory setting, or system data may be lost completely such that the system cannot boot properly. Moreover, most of the product defect reports show that the embedded file system is damaged or incomplete, and therefore backing up and recovering embedded file system is an important function.

Current backup and recovery technology only determines whether to backup and recover through the backup data according to the status of last system boot. However, the backup data may be lost due to being stored for too long or may be incomplete due to changes made by user. As such, the current backup and recovery technology is unable to confirm the existence of the backup data nor the completeness or intactness of the backup data, which in turn causes poor flexibility, requires laborious maintenance, and high maintenance cost.

In view of this, a backing up and recovering method and a communication device that detect whether a file system is damaged and checks whether a backup data exists at the same time is in dire need for the related industry.

SUMMARY

In one aspect, the present disclosure provides a backing up and recovering method of a file system, and the backing up and recovering method includes a detecting step and a transmitting step. In the detecting step, a first processing unit is driven to detect whether the file system stored in a storage unit is damaged and to generate a detection result. The storage unit is configured to store a plurality of backup lists and a backup data that correspond to the file system. In the transmitting step, the first processing unit is driven to transmit the detection result to a second processing unit. In response to the detection result being the file system is damaged, the second processing unit executes a system recovering step. The system recovering step includes recovering the file system according to the backup data. In response to the detection result being the file system is not damaged, the second processing unit executes a backup confirming step including confirming whether the backup data is stored in the storage unit.

In another aspect, the present disclosure provides a communication device with a storage unit, a first processing unit, and a second processing unit. The storage unit is configured to store a file system, and a plurality of backup lists and a backup data corresponding to the system. The first processing unit is connected to the storage unit and detects whether the file system is damaged and then generates a detection result. The second processing unit is connected to the storage unit and the first processing unit and receives the detection result. In response to the detection result being the file system is damaged, the second processing unit executes a system recovering step that includes recovering the file system according to the backup data. In response to the detection result being the file system is not damaged, the second processing unit executes a backup confirming step including confirming whether the backup data is stored in the storage unit.

BRIEF DESCRIPTION OF THE DRAWINGS

The present disclosure can be more fully understood by reading the following detailed description of the embodiment, with reference made to the accompanying drawings as follows.

DETAILED DESCRIPTION

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a", "an", and "the" includes plural reference, and the meaning of "in" includes "in" and "on". Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms, such as "first", "second" or "third" can be used to describe various components, signals or the like, which are for distinguishing one component/signal from another one only, and are not intended to, nor should be construed to impose any substantive limitations on the components, signals or the like.

Figure 1:
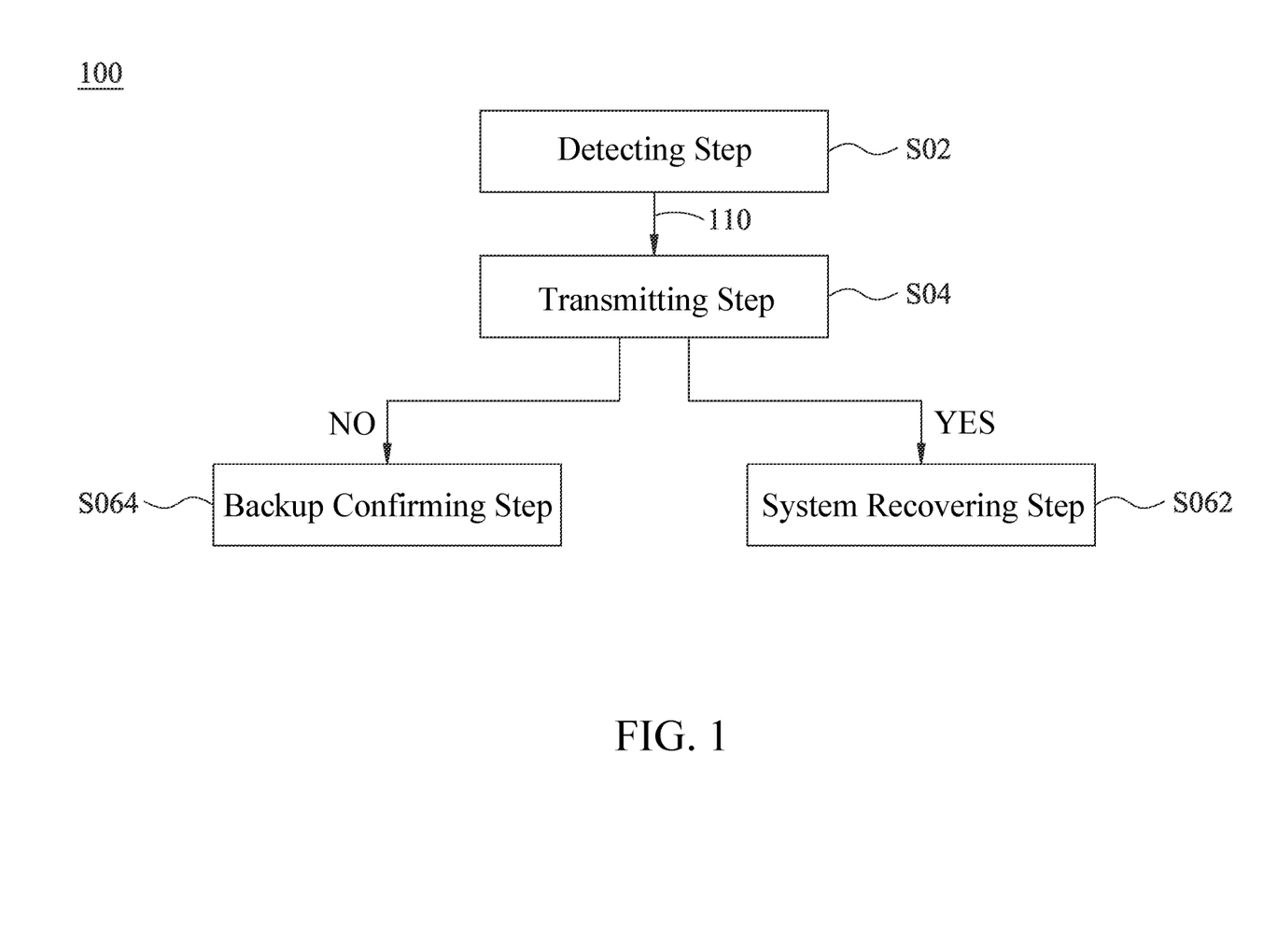
FIG. 1 is a schematic flow chart of a backing up and recovering method of a file system according to a first embodiment of the present disclosure.

Referring to FIG. 1, a backing up and recovering method 100 of a file system according to a first embodiment includes a detecting step S02 and a transmitting step S04.

The detecting step S02 is performed to drive a first processing unit to detect whether the file system stored in a storage unit is damaged, and then to generate a detection result 110 accordingly. The storage unit is configured to store and access a plurality of backup lists and a backup data, and the plurality of backup lists and the backup data correspond to the file system. The transmitting step S04 is performed to drive the first processing unit to transmit the detection result 110 to a second processing unit.

In specific, when the detection result 110 is that the file system is damaged, or that the detection result 110 is "yes", the second processing unit executes a system recovering step S062. The system recovering step S062 includes recovering the file system according to the backup data stored in the storage unit, and in particular, the file system is recovered according to the backup data which is backed up according to one of the backup lists. When the detection result 110 is that the file system is not damaged, or that the detection result 110 is "no", the second processing unit executes a backup confirming step S064. The backup confirming step S064 is performed to confirm whether the storage unit stores the backup data, or in other words, whether the backup data is stored in the storage unit. As such, the backing up and recovering method 100 of the file system of the present disclosure drives the second processing unit to execute the system recovering step S062 or the backup confirming step S064 according to the detection result 110 generated by the first processing unit, and so not only is the damaged file system recovered, the storage unit is also confirmed to store/have the backup data to prevent the file system, if damaged in the future, from unable to recover due to missing backup data.

Figure 2:
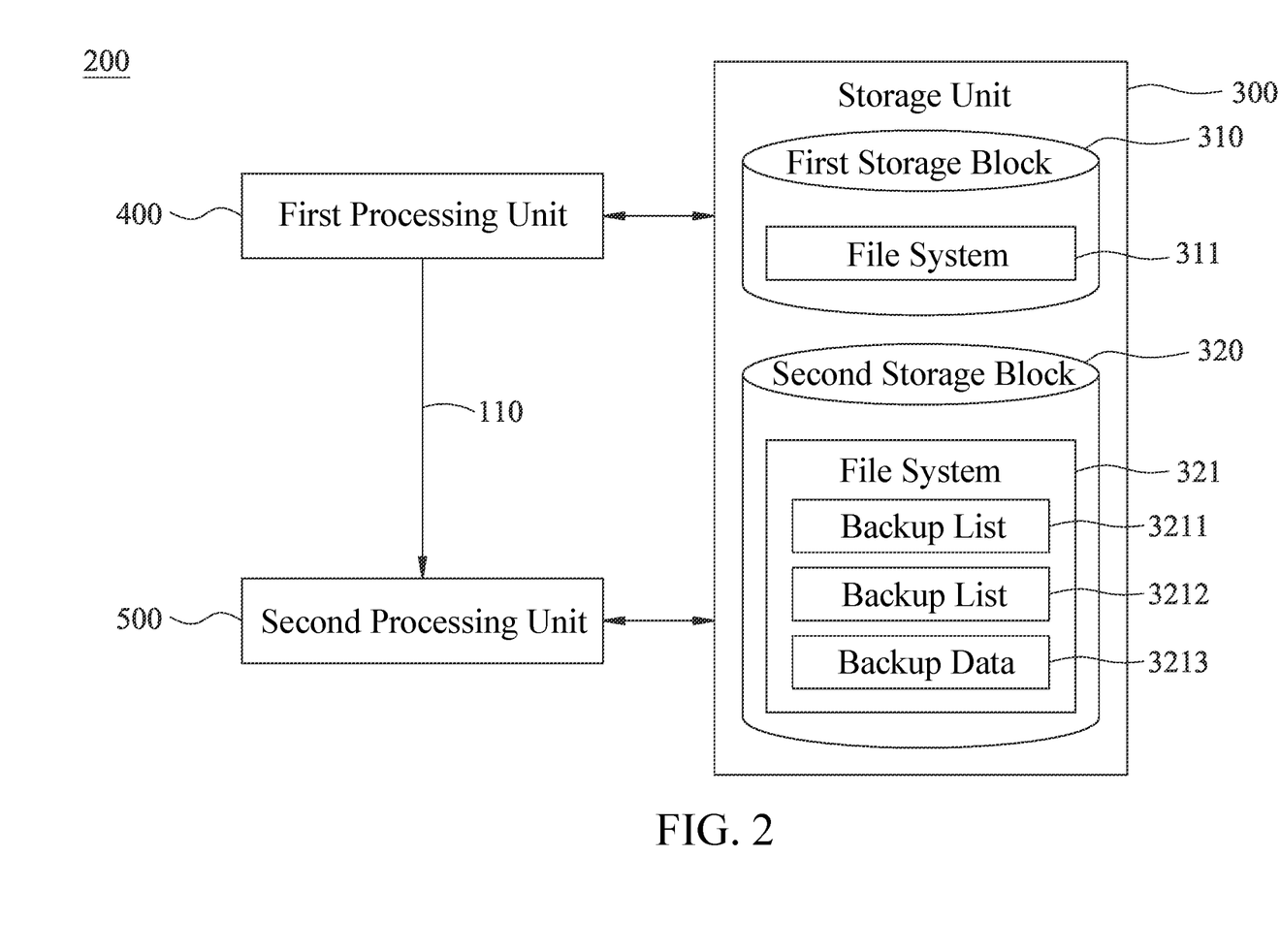
FIG. 2 is a schematic diagram of a communication device according to a second embodiment of the present disclosure.

Referring to FIG. 1 and FIG. 2, a communication device 200 in a second embodiment is configured to implement the backing up and recovering method 100 of the file system of the first embodiment. The communication device 200 includes a storage unit 300, a first processing unit 400, and a second processing unit 500.

The storage unit 300 includes a first storage block 310 and a second storage block 320. The first storage block 310 is configured to store a file system 311. The second storage block 320 is configured to store another file system 321, and the file system 321 is configured to store and access two backup lists 3211, 3212 and a backup data 3213.

The first processing unit 400 is connected to the storage unit 300 and detects whether the file system 311 is damaged, and then generates a detection result 110. The second processing unit 500 is connected to the storage unit 300 and the first processing unit 400 and receives the detection result 110 from the first processing unit 400. More specifically, the communication device 200 can be a modem, a communication module inside an electronic device, or a communication module disposed in a vehicle, and the present disclosure is not limited thereto. The storage unit 300 is a memory. The first processing unit 400 is a modulator-demodulator (modem) processor. The second processing unit 500 is an application processor (AP). The file system 311 is an embedded file system (EFS), and the file system 321 is an unsorted block image file system (UBIFS), but the present disclosure is not limited thereto.

In response to the detection result 110 being the file system 311 is damaged, the second processing unit 500 executes the system recovering step S062, and in response to the detection result 110 being the file system 311 is not damaged, the second processing unit 500 executes the backup confirming step S064. Thus, through the second processing unit 500 executing the system recovering step S062 or the backup confirming step S064 according to the detection result 110 generated by the first processing unit 400, the communication device 200 of the present disclosure is able to recover the damaged file system 311 and is also able to ensure that the backup data 3213 is stored in the storage unit 300, so that if the file system 311 becomes damaged in the future, it can be recovered by the backup data 3213, and thereby preventing the unrecoverable instance due to missing the backup data 3213.

Figure 3:
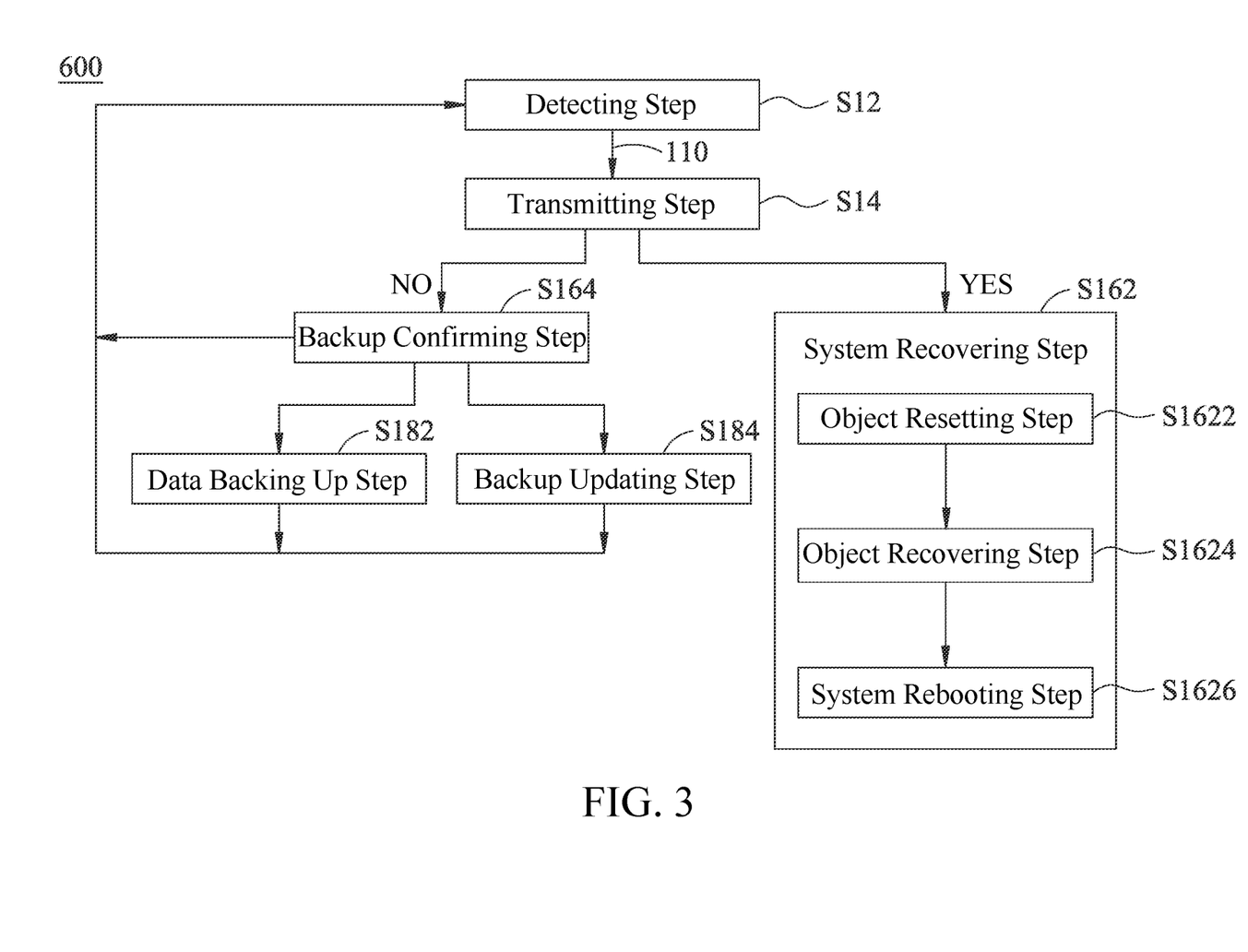
FIG. 3 is a schematic flow chart of a backing up and recovering method of a file system according to a third embodiment of the present disclosure.
Figure 4:
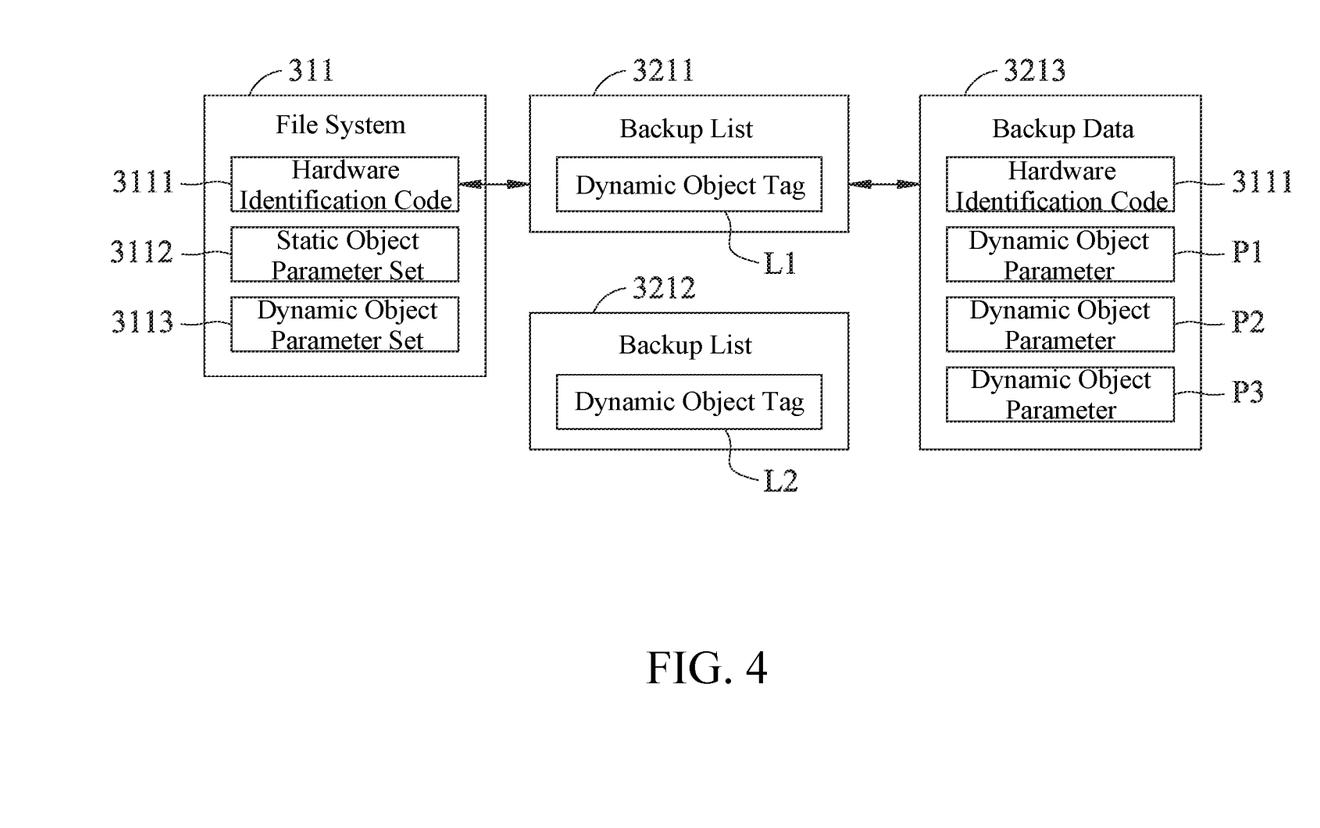
FIG. 4 is a schematic diagram illustrating a file system in a first storage block and two backup lists and a backup data of another file system in a second storage block of FIG. 2.

Referring to FIG. 2, FIG. 3, and FIG. 4, a backing up and recovering method 600 of a file system according to a third embodiment can be implemented in the communication device 200. The backing up and recovering method 600 includes a detecting step S12, a transmitting step S14, a system recovering step S162, and a backup confirming step S164. The detecting step S12, the transmitting step S14, and the backup confirming step S164 are the same as the corresponding steps in the backing up and recovering method 100 of the first embodiment and therefore will not be described herein.

The difference between the third embodiment and the first embodiment is that the system recovering step S162 further includes an object resetting step S1622, an object recovering step S1624, and a system rebooting step S1626. The object resetting step S1622 is performed to drive the second processing unit 500 to delete the damaged file system 311 and reset a static object parameter set 3112 of the file system 311. The object recovering step S1624 includes driving the second processing unit 500 to recover a dynamic object parameter set 3113 to the file system 311 according to the backup data 3213 in the file system 321. The system rebooting step S1626 is performed to drive the second processing unit 500 to reboot the recovered file system 311.

More particularly, the file system 311 shown in FIG. 4 includes a hardware identification code 3111, a static object parameter set 3112, and a dynamic object parameter set 3113. The hardware identification code 3111 is an identification code string defined by vendors based on different product devices, and the hardware identification code 3111 is recorded/stored in the file system 311. In other words, the file system 311 has the hardware identification code 3111 of the product device that the file system 311 is installed in. The static object parameter set 3112 is mainly related to firmware and can be created/established by the firmware, and therefore the static object parameter set 3112 does not need to be recovered to the file system 311 through the backup data 3213. In the object resetting step S1622, the second processing unit 500 first deletes the static object parameter set 3112 and the dynamic object parameter set 3113 of the damaged file system 311, and then creates a new static object parameter set 3112 through its own firmware (of the second processing unit 500).

Further, as shown in FIG. 2, the file system 321 has access the two backup lists 3211, 3212 and the backup data 3213, and the two backup lists 3211, 3212 respectively correspond to two hardware identification codes (HWID) and respectively list two dynamic object tags L1, L2. For example, the backup list 3211 in FIG. 4 corresponds to the hardware identification code 3111 and lists the dynamic object tag L1. The backup list 3212 corresponds to another hardware identification code (not illustrated) and lists another dynamic object tag L2. The backup data 3213 in FIG. 4 stores a hardware identification code 3111 and three dynamic object parameters P1, P2, P3. The object recovering step S1624 further includes recovering the dynamic object parameters P1, P2, P3 stored in the backup data 3213 to the file system 311. The dynamic object parameter set 3113 is composed of the dynamic object parameters P1, P2, P3.

In particular, the dynamic object parameter set 3113 is written into the file system 311 during factory calibration process, and thus the tag, which all of the parameters in the dynamic object parameter set 3113 correspond to, is recorded in one of the backup lists stored in the file system 321. The tag is namely the dynamic object tag L1, and the one of the backup lists is namely the backup list 3211. In the present disclosure, according to different hardware identification codes, different dynamic object parameter sets are selected during calibration process, and so each of the hardware identification codes corresponds to one backup list. In other embodiments, the number of backup lists can be plural, and the number of dynamic object parameters can be plural, the present disclosure is not limited thereby. Then, after the second processing unit 500 created the new static object parameter set 3112 and recovered the new dynamic object parameter set 3113 to the file system 311, the second processing unit 500 executes the system rebooting step S1626 to complete the recovery of the file system 311. Hence, in comparison to the current backup and recovery technology, the backing up and recovering method 600 of the file system of the present disclosure recovers the file system 311 with the backup data 3213 backed up by the backup list 3211 corresponding to the hardware identification code 3111 so as to recover the preferred dynamic object parameter set 3113 specific to the product device. The recovery is more flexible since there is no need to recover the dynamic object parameters of other product devices to the file system 311, and the maintenance cost is reduced because there is no need for manual maintenance. In addition, the second storage block 320 of the file system 321 stores many backup lists, and so in terms of the backup and recovery of the file system 311 in the first storage block 310, a plurality of product devices can be supported.

On the other hand, the backup data 3213 is prone to missing data due to long term storage, or being incomplete due to user changes or product device updates. Referring to FIG. 3, in the backup confirming step S164, when there is no backup data 3213 in the second storage block 320 of the storage unit 300, the second processing unit 500 executes a data backing up step S182. When the second storage block 320 of the storage unit 300 stores the backup data 3213 but the backup data 3213 is incomplete or damaged, the second processing unit 500 executes a backup updating step S184. When the backup data 3213 is stored in the second storage block 320 of the storage unit 300 and is complete and normal, the second processing unit 500 executes the detecting step S12 again. In other words, the backend continues to perform the detecting step S12 during system operation so as to repair and recover the file system 311 immediately when damage is detected.

The data backing up step S182 is performed to drive the second processing unit 500 to create the backup data 3213 according to the file system 311 and to save/store the backup data 3213 in the file system 321 stored in the second storage block 320 of the storage unit 300. In specific, the file system 311 is undamaged and has the hardware identification code 3111, the static object parameter set 3112, and the dynamic object parameter set 3113 stored therein, and the dynamic object parameter set 3113 is composed of three dynamic object parameters P1, P2, P3. In the data backing up step S182, the second processing unit 500 selects the backup list 3211 according to the hardware identification code 3111 stored in the file system 311 and, according to the dynamic object tag L1 listed in the backup list 3211, backs up the hardware identification code 3111 and the dynamic object parameters P1, P2, P3 to create/establish the backup data 3213. Then, the second processing unit 500 proceeds to the detecting step S12 again and the backend continues to detect for damage in the file system 311.

To that end, the backup updating step S184 is performed to drive the second processing unit 500 to select the backup list 3211 according to the hardware identification code 3111 in the file system 311 and, according to the dynamic object label L1 listed in the backup list 3211, to update the dynamic object parameters P1, P2, P3 to the backup data 3213 so as to replace the prior incomplete or damaged backup data 3213. Subsequently, the second processing unit 500 returns to the detecting step S12. Thus, in comparison to the conventional backup and recovery technology, the backing up and recovering method 600 of the file system as provided by the present disclosure further ensures that when the file system 311 becomes damaged in the future, the storage unit 300 has the complete and newest backup data 3213, and so that the situation where the damaged file system 311 cannot be recovered due to a lack of backup data 3213 is avoided.

In view of the above, the present disclosure encompasses the following advantages. First, the system recovering step and the backup confirming step are respectively executed according to different detection results, and so not only can the damaged file system be recovered, but also the backup data is ensured to be saved in the storage unit in case the file system becomes damaged in the future, thereby preventing the unrecoverable situation due to missing backup data. Second, optimal recovery is performed by recovering dynamic object parameter set according to specific product device instead of recovering all dynamic object parameters of all product devices to the file system, and thereby increasing flexibility, eliminating laborious maintenance, and reducing maintenance cost. Third, since the other file system in the second storage block stores multiple backup lists, multiple product devices can be supported when it comes to backing up and recovering the file system in the first storage block.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. A backing up and recovering method of a file system, the method comprising:

a detecting step comprising driving a first processing unit to detect whether the file system stored in a storage unit is damaged and then to generate a detection result, wherein the storage unit is configured to store a plurality of backup lists and a backup data that correspond to the file system; and a transmitting step comprising driving the first processing unit to transmit the detection result to a second processing unit;

wherein, in response to the detection result being the file system is damaged, the second processing unit executes a system recovering step comprising recovering the file system according to the backup data;

wherein, in response to the detection result being the file system is not damaged, the second processing unit executes a backup confirming step comprising confirming whether the backup data is stored in the storage unit;

wherein the system recovering step further comprises:

an object resetting step comprising driving the second processing unit to delete the file system and to reset a static object parameter set of the file system; and an object recovering step comprising driving the second processing unit to recover a dynamic object parameter set to the file system according to the backup data.

2. The backing up and recovering method of the file system according to claim 1, wherein the system recovering step further comprises:

a system rebooting step comprising driving the second processing unit to reboot the file system.

3. The backing up and recovering method of the file system according to claim 1, wherein the plurality of backup lists respectively correspond to a plurality of hardware identification codes and respectively list a plurality of dynamic object tags, the backup data stores one of the plurality of hardware identification codes and a plurality of dynamic object parameters.

4. The backing up and recovering method of the file system according to claim 3, wherein the object recovering step further comprises recovering the plurality of dynamic object parameters stored in the backup data to the file system.

5. The backing up and recovering method of the file system according to claim 1, wherein, when the backup data is not stored in the storage unit, the second processing unit executes a data backing up step; and when the backup data is stored in the storage unit and the backup data is incomplete or damaged, the second processing unit executes a backup updating step.

6. The backing up and recovering method of the file system according to claim 5, wherein the data backing up step comprises driving the second processing unit to create the backup data according to the file system and to store the backup data in the storage unit.

7. The backing up and recovering method of the file system according to claim 6, wherein the plurality of backup lists respectively correspond to a plurality of hardware identification codes and respectively list a plurality of dynamic object tags, the file system stores one of the plurality of hardware identification codes and a plurality of dynamic object parameters, and the second processing unit selects one of the plurality of backup lists according to the one of the hardware identification codes stored in the file system and creates the backup data by backing up the plurality of dynamic object parameters stored in the file system according to the dynamic object tag listed in the one of the backup lists.

8. The backing up and recovering method of the file system according to claim 5, wherein the plurality of backup lists respectively correspond to a plurality of hardware identification codes and respectively list a plurality of dynamic object tags, the file system stores one of the plurality of hardware identification codes and a plurality of dynamic object parameters, and the backup updating step comprises driving the second processing unit to select one of the plurality of backup lists according to the one of the hardware identification codes stored in the file system and to update the dynamic object parameters stored in the file system to the backup data according to the dynamic object tag listed in the one of the backup lists.

9. The backing up and recovering method of the file system according to claim 1, wherein the storage unit comprises:

a first storage block for storing the file system; and a second storage block for storing another file system, wherein the another file system is configured to access the plurality of backup lists and the backup data.

10. The backing up and recovering method of the file system according to claim 1, wherein the backup data is backed up according to one of the plurality of backup lists.

11. A communication device comprising:

a storage unit, configured to store a file system, and a plurality of backup lists and a backup data corresponding to the file system;

a first processing unit, connected to the storage unit, for detecting whether the file system is damaged and generating a detection result; and a second processing unit, connected to the storage unit and the first processing unit, for receiving the detection result;

wherein, in response to the detection result being the file system is damaged, the second processing unit executes a system recovering step comprising recovering the file system according to the backup data;

wherein, in response to the detection result being the file system is not damaged, the second processing unit executes a backup confirming step comprising confirming whether the backup data is stored in the storage unit;

wherein the system recovering step further comprises:

an object resetting step comprising driving the second processing unit to delete the file system and to reset a static object parameter set of the file system; and an object recovering step comprising driving the second processing unit to recover a dynamic object parameter set to the file system according to the backup data.

12. The communication device according to claim 11, wherein the system recovering step further comprises:

a system rebooting step comprising driving the second processing unit to reboot the file system.

13. The communication device according to claim 1, wherein the plurality of backup lists respectively correspond to a plurality of hardware identification codes and respectively list a plurality of dynamic object tags, the backup data stores one of the plurality of hardware identification codes and a plurality of dynamic object parameters.

14. The communication device according to claim 13, wherein the object recovering step further comprises recovering the plurality of dynamic object parameters stored in the backup data to the file system.

15. The communication device according to claim 11, wherein,
when the backup data is not stored in the storage unit, the second processing unit executes a data backing up step; and
when the backup data is stored in the storage unit and the backup data is incomplete or damaged, the second processing unit executes a backup updating step.

16. The communication device according to claim 15, wherein the data backing up step comprises driving the second processing unit to create the backup data according to the file system and to store the backup data in the storage unit.

17. The communication device according to claim 16, wherein the plurality of backup lists respectively correspond to a plurality of hardware identification codes and respectively list a plurality of dynamic object tags, the file system stores one of the plurality of hardware identification codes and a plurality of dynamic object parameters, and the second processing unit selects one of the plurality of backup lists according to the one of the hardware identification codes stored in the file system and creates the backup data by backing up the plurality of dynamic object parameters stored in the file system according to the dynamic object tag listed in the one of the backup lists.

18. The communication device according to claim 15, wherein the plurality of backup lists respectively correspond to a plurality of hardware identification codes and respectively list a plurality of dynamic object tags, the file system stores one of the plurality of hardware identification codes and a plurality of dynamic object parameters, and the backup updating step comprises driving the second processing unit to select one of the plurality of backup lists according to the one of the hardware identification codes stored in the file system and to update the dynamic object parameters stored in the file system to the backup data according to the dynamic object tag listed in the one of the backup lists.

19. The communication device according to claim 11, wherein the storage unit comprises:
a first storage block for storing the file system; and
a second storage block for storing another file system, wherein the another file system is configured to access the plurality of backup lists and the backup data.

20. The communication device according to claim 11, wherein the backup data is backed up according to one of the plurality of backup lists.

* * * * *